United States Patent Office

3,849,582
Patented Nov. 19, 1974

3,849,582
FORTIFIED SNACK PROCESS AND PRODUCT
Peter A. Blagdon, University City, Wayne R. Malzahn, Ballwin, and Huygene K. Fujiwara, Clayton, Mo., assignors to Ralston Purina Company, St. Louis, Mo.
No Drawing. Continuation of abandoned application Ser. No. 64,553, Aug. 17, 1970. This application Feb. 5, 1973, Ser. No. 329,793
Int. Cl. A23l *1/10*
U.S. Cl. 426—152                                    6 Claims

ABSTRACT OF THE DISCLOSURE

A process for producing nutritious protein fortified low calorie snack food products is disclosed. The process involves fortifying carbohydrate materials such as substantially gelatinized starch with a protein material which has not been substantially heat gelled. The fortified carbohydrate material can then be formed into a variety of snack food products, such as snack chips, which exhibit an increased shelf life, improved organoleptic properties, reduced calorie content, and improved nutritional value.

This is a continuation of application Ser. No. 64,553, filed Aug. 17, 1970, now abandoned.

BACKGROUND OF THE INVENTION

The prior art has taught a wide variety of processes for producing snack food products and products made by a number of these processes are currently available to the consumer. Typically, many of these products are deep fat fried to give the product a puffed or expanded configuration. However, the fat fried products of the art have the disadvantage of adsorbing too much fat on frying, resulting in a product which has a high energy content and which is not acceptable to consumers who want a low calorie snack product. To avoid the problem of high fat content, it has been suggested that snack products be formed from a dough containing a low fat content and cooked by high temperature oven drying or by exposure to microwave or infrared radiation. These methods do avoid the problem of a high fat content in the product, but fail to produce the high palability which is developed in the frying process.

The prior art has also failed to provide a satisfactory shelf life in a fried product. Typically, the products of the prior art adsorb moisture during storage and develop a stale, soggy texture and a rancid flavor due to the oxidation of the fat present in the product. It would fill a need in the snack food market, therefore, to provide a process of producing a nutritionally fortified, relatively low calorie snack food product which has high palability and a long, stable shelf life on storage and which does not have the high fat content of normally prepared fat fried products.

SUMMARY OF THE INVENTION

The invention relates to a novel process for preparing low calorie, low density snack type food products having increased nutritional value, particularly an enhanced protein content, and to the product produced by the process.

The process involves a method of producing a snack product intermediate which does not pick up an excessive amount of fat when converted to a snack food product by frying and to the finished snack product. The finished product has an exceptional shelf life and does not develop rancidity as rapidly as known products due to the low fat content. The product remains fresh and crisp for long periods of time due to the properties of an *in situ* heat gelled protein and to the stabilization of the starch content by a starch modifying agent. The starch modifying agent acts to block the hydrophilic sites on the starch molecule to prevent the pick-up of an excessive amount of water during the mixing of the snack product dough prior to forming. The starch modifying agent permeates the starch matrix and lubricates the mix enabling a smooth dough to be formed at a low moisture content. The mixed dough, containing 30 to 48% water, 41 to 49% starch or flour, 16 to 25 protein, and 0.25 to 4% of a starch modifying agent, is then formed into a shaped product, preferably by extruding. The shaped product is then converted to a snack food product, preferably by frying. During the frying operation, the product is heated by the hot oil and the frying operation, the product is heated by the oil and the water content of the product boils off and is partially replaced by oil from the frying bath. Since the hydrophilic sites of the starch molecule have been blocked by the starch complexing agent during mixing and possibly by the protein, there is less water boil off and less fat adsorbtion by the snack food intermediate during the frying step. The heat of the frying step also serves to set or heat gel the protein source. It is believed that the heat gelled protein present in the product matrix and the retained starch complexing agent resist readsorption of moisture and produce a finished snack food product which remains crisp and palatable during a long storage period. The moisture content of the cooked product will typically be in the range of 2 to 6% by weight; the protein content will be from 16 to 25% by weight; the starch content may be from 48 to 56% by weight; and fat content between 12 and 35% by weight.

The starch source used in the process may be any of the common grain source materials such as wheat, rice, corn, flours, or starch, as well as starches or flours from common tubers such as potato or tapioca source material. The starch material should be substantially pre-gelatinized prior to being cooked to inhibit excessive browning of the product during the cooking step. Modified starch materials such as acid modified starches or esterified starches, partially dextrinized, or partially genatinized starches may also be added to the product to modify extrusion, frying, mixing and handling characteristics.

The protein source material may be any of the high purity protein sources such as casein, albumin, or oilseed protein isolates. Soy protein isolates containing at least about 90 to 95% protein on a dry basis are preferred.

DESCRIPTION OF THE PREFERRED EMBODIMENTS

The concept of this invention pertains broadly to a process for producing a nutritionally fortified snack food intermediate product from both starch and protein sources which has superior organoleptic properties and an increased shelf life and which has a reduced fat and calorie content on frying, and the fried product. The method involves preparing a dough of a starch source, the protein source and a starch modifying or complexing reagent which blocks the hydrophilic sites on the starch molecules so that they do not take up or bind water and less total water is needed to form the dough.

A modified starch source may be used, such as an acid modified waxy maize starch, a cereal starch or flour such as wheat, rice or corn may be used, or a tuber starch or flour such as tapioca or potato may be used. It is preferred that the starch material be substantially pre-gelatinized before being used in the process. If a modified starch is used, it may be added in proportions up to about 15% by weight. Typical modified starch materials are the acid modified, esterified and enzyme modified starches. An acid modified starch suitable for use in the product of this invention may be obtained from National Starch Co. under the trade name "Fry A Snack." Modified starches may be used to improve texture and cooking characteristics of the product.

The protein source may be any high purity protein, for example, milk, egg, or oilseed proteins. The protein material should not have been substantially heat set or gelled prior to being used in the process of the invention, however. We have found that a functional isolated soy protein having a protein content of at least about 90 to 95% by weight on a dry basis is preferred.

The starch modifying and complexing agent may be a saturated monoglyceride material which will react to mask the hydrophilic sites on the starch molecule to prevent the hydration of the starch molecule by water. A preferred saturated monoglyceride material for masking the hydrophilic sites on the starch molecule is glyceryl monostearate.

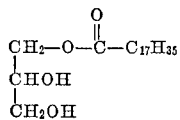

The process of the invention involves preparing a mix of the starch source, the protein source, the starch complexing agent, and water. The water is added in smaller proportions than would normally be required without the starch modifying agent. The mix is then formed into the shape of a snack food product such as a snack chip. The forming is preferably performed on an extruder, e.g., a De Francisci Press. The dough should be extruded under conditions that do not heat gel the protein present in the dough mix in order to preserve the heat gelling characteristics of the protein until the fat frying step.

In forming the dough mix the starch source is added at a level of between about 41 and 49% by weight of the mix and the protein source is added at a level of between about 16 and 25% by weight of the mix. Between about 0.25 and 4% by weight of the starch modifying reagent is added to the mix and between 30 and 48% by weight water. The mix is worked to form a free-flowing mixture, usually between 5 and 25 minutes. A conventional dough mixer may be used, such as a commercial ribbon blender.

We believe that the starch complexing agent acts to align the starch and protein molecules of the mix and to lubricate the molecules so that intermolecular slippage is possible at a much lower moisture content than in a dough made without the added reagent. The starch complexing agent is a polar structure which is hydrophilic at one end of the molecule and lipophilic on the other end. The hydrophilic end of the starch complexing molecule attaches itself at the sites of the starch molecule which would normally be occupied by water, particularly the sites in the amylose fraction of the starch molecule. The lipophilic portion of the starch modifying reagent resists hydration by water and acts to lubricate the spaces between the molecules. The resulting dough is thus able to develop the proper viscosity or elasticity for working at a lower moisture content. The starch modifying reagent also is believed to operate on the protein source in a similar fashion, though the water resisting effect may be somewhat less than that occurring with starch. Due to the blockage of the water accepting sites on the starch and possibly the protein molecules there is less total water present in the dough and in the intermediate product formed from the dough. As a result, there is less water to boil off during the frying operation to be replaced by fat from the frying bath.

The forming of the dough into the intermediate product by extrusion is performed by passing the dough through the barrel of the extruder where the dough is mixed and worked by the action of the extruder screw. The screw flights tend to advance the dough faster than it can be expelled from the extruder causing back-mixing and a great deal of internal friction in the dough. The friction develops heat in the mix and care must be taken to prevent the build-up of heat in the product to the point where the protein source is prematurely heat set or gelatinized. Preferably, the extrusion is performed in an extruder which is equipped with cooling jackets along the length of the barrel. A cooling medium such as cool water is circulated in the cooling jackets to reduce the heat build-up in the material in the extruder. Heat can also be added along the extruder barrel to maintain the temperature at a desired level, if necessary. Preferably, the extruder is operated to maintain the product at a temperature of between about 155° and 185° F. as the product leaves the extruder. The optimum temperature of the product leaving the extruder is about 170° F. The product leaving the extruder passes through a restricted outlet or die which forms the dough mix into a flattened sheet or ribbon. To form a desirable, crisp snack product when fried, the sheet or ribbon will be between about .018 and .050 inch thick as it leaves the die. After the sheet or ribbon leaves the die, it passes over rolls onto a belt. The rolls and belt are preferably operated at a speed which will stretch the dough sheet or ribbon. By imparting a stretch to give the dough an elongation of from preferably about 25 to 100% or more, the cooking characteristics of the dough are improved. The stretched ribbon exhibits much better texture on frying; the fried product has fewer large, fragile bubbles, is denser and has greater strength than an unstretched product. The unstretched product tends to form large, hollow, balloon-like structures when fried which are not suitable for snack chip products. The large bubbles break during handling, packaging, and transporting and produce a crumbled, unsatisfactory product. The large balloon structures also do not have the strength required of a snack chip product and fracture when used as a dip cracker. However, the hollow structures could be satisfactorily used for containers for filled type products such as egg rolls or ravioli.

The desirable elasticity in the dough mix is believed to be developed by the use of the starch modifying material during the mixing of ingredients prior to extrusion. The starch chains and possibly the protein chains are believed to be longitudinally aligned due to the action of the starch modifying material with the intermolecular spaces lubricated so that intermolecular slippage is possible. The alignment and slippage are believed to give the mix the resilience and elasticity needed for a good stretch prior to frying.

The ribbon or sheet is then cut to form strips by a conventional means such as a rotating cutter or a similar device. A finished cooked snack food product would preferably be in the form of a thin rectangular strip of approximately 1¼" x 2½" x ⅛" dimensions. The snack food intermediate strip leaving the extruder will contain about 41 to 49% starch, about 16 to 25% protein, about 30 to 48% water, and about 0.25 to 4% of the starch modifying reagent. The cut strips may then be transferred to a fat frying bath. During the transfer operation the strips may lose between 2 and 4% moisture. The moisture content of the strips placed in the frying bath will typically be between 30 and 46% water by weight.

The strips are fried in a fat fry bath for between 15 and 60 seconds at a temperature of between 350 and 425° F. to develop the crisp texture of a snack food product and to develop the palatable taste expected in a snack product. The material should have a pleasant golden color when removed from the fry bath, should have friable texture in the mouth, and be free of any raw spots. Excessive browning should be avoided in the product to prevent a dark color in the product which is not appealing to the consumer and to prevent deterioration of the nutritional quality of the product due to the browning reaction of the protein. The pleasing taste which develops in the product is due in part to the controlled development of flavor by the browning reaction and in part by the adsorption of fat. The presence of fat in the product is essential for proper palatability; however, excess adsorption is not desirable since the energy content or caloric value of the resulting product is increased and the tendency of the product to develop fat oxidative rancidity is increased. Due to the low moisture content of the material entering the frying bath, the excessive pick-up of fat during the frying operation is prevented. During frying, the heat from the frying oil causes the water in the fried product to boil, resulting in a dehydrating action on the fried material. The water which leaves the product is replaced by fat from the frying bath resulting in a fried product which is lower in water and higher in fat than the original starting material. By controlling the amount of water present in the starting material, a finished fried product can be produced which has a controlled fat content. By having less water to boil off during the frying operation, there is less water to be replaced by fat in the product matrix.

The frying operation also heat gels the protein material to a crisp sub-matrix which resists readsorption of water by the finished product. The gelled protein sub-matrix and the starch matrix which has been modified to resist water adsorbtion combine to produce a product which remains crisp for a long period of time even at relatively high moisture content. By remaining crisp and resisting oxidative rancidity, a product can be produced which has exceptional palatability, a long shelf life and storage stability, and which has a lower energy or caloric value than prior fat fried snack products.

To assure that one having ordinary skill in the art will understand this invention, the following examples are provided:

Example 1

A protein fortified potato snack chip was prepared from:

| Ingredients: | Parts by weight |
|---|---|
| Pre-gelatinized potato flakes | 920 |
| Isolated soy protein (Ralston Purina Company Supro 610) | 300 |
| Salt | 60 |
| Glyceryl monostearate | 20 |
| Water | 720 |

By mixing the water, salt, and glyceryl monostearate in an Oster blender and by mixing dry ingredients in a Hobart mixer, when blended, the wet ingredients were added to the dry ingredients and mixing was continued until the mass was free-flowing. The mixture was then extruded on a De Francisci Press using a .050 by 1 inch ribbon die. Water at 165° F. was circulated in the extruder jacket; the extruded ribbon was stretched from 40 to 60% as it left the die. The ribbon was cut into 2 to 3 inch lengths and fried at 375° F. for about 45 seconds. The fried product had a light golden color and a highly pleasing taste with a very crisp mouthfeel and fiber texture.

Example 2

A potato snack type product was prepared as described in Example 1, but using:

| Ingredients: | Parts by weight |
|---|---|
| Pre-gelatinized potato flakes | 720 |
| Acid modified starch (Fry A Snack) | 200 |
| Isolated soy protein | 300 |
| Salt | 60 |
| Glyceryl monostearate | 20 |
| Water | 720 |

The material was mixed, extruded as described in Example 1. The fried product had a crosp mouthfeel and pleasing taste similar to the product of Example 1.

Example 3

A wheat snack chip product was prepared as described in Example 1 by mixing:

| Ingredients: | Parts by weight |
|---|---|
| Pre-gelatinized wheat flakes | 720 |
| Fry A Snack | 200 |
| Isolated soy protein | 300 |
| Salt | 60 |
| Glyceryl monostearate | 20 |
| Water | 720 |

The material was mixed, extruded and fried as described in Example 1. The prepared snack product was dark brown with a mild wheat flavor, had a friable texture with a very crisp mouthfeel and pleasing taste.

Example 4

A potato snack chip product was prepared as described in Example 1 from:

| Ingredients: | Parts by weight |
|---|---|
| Pre-gelatinized potato flakes | 720 |
| Isolated soy protein | 300 |
| Fry A Snack | 200 |
| Salt | 60 |
| Glyceryl monostearate | 80 |
| Water | 720 |

The product was mixed, extruded and fried as in Example 1. The mixed dough was noticeable lump free and extruded very smoothly and produce an extremely stretchy, resilient ribbon. The product when fried was similar to that in Example 1, but was noticeably free of large blisters.

Example 5

The experiment of Example 4 was repeated without any glyceryl monostearate being added to the product. The mixture was noticeably lumpy and the extruded ribbon did not stretch as well as the product in Example 4 or in Example 1. The fried product ballooned into a large hollow structure.

Example 6

Parallel runs to produce a potato snack chip product were conducted as described in Example 1, but using sodium caseinate and lactalbumin as the protein sources. The fried snack chip products were similar to that as described in Example 1, but tended to darken quickly on frying and did not have as pleasing a taste as the product of Example 1.

Example 7

A corn snack chip product was prepared by the method of Example 1 using:

| Ingredients: | Parts by Weight |
|---|---|
| Pre-gelatinized alkali treated corn flour | 720 |
| Fry A Snack | 200 |
| Isolated soy protein | 300 |
| Salt | 60 |
| Glyceryl monostearate | 20 |
| Water | 720 |

The product was mixed, extruded and fried as described in Example 1. A light brown chip product was produced having a tortilla flavor with good crisp mouthfeel and frangible texture.

Example 8

Parallel runs were made to produce a potato snack chip product by mixing:

| Ingredients: | Parts by Weight |
|---|---|
| Pre-gelatinized potato flakes | 41.0 |
| Isolated soy protein | 17.5 |
| Fry A Snack | 11.3 |
| Salt | 4.2 |
| Glyceryl monostearate | 1.3 |
| Water | 24.8 |

The products were mixed in a commercial ribbon blender until free-flowing and then extruded on a Johnson extruder through a 0.040" by 12" die. The temperature of the product leaving the die was 170° F. The ribbon exiting the die was divided into 12 1 inch strips. Parallel runs were conducted, stretching the product 25%, 45%, 60%, 75%, and 85%. The product was cut into 2 inch sections and fried and 365° F. for 30 seconds. The product stretched 25% exhibited some blistering, but was an acceptable product. The product stretched 45% had very little blistering and the remaining products exhibited almost no blistering. The fried products had a light golden color, a pleasing potato flavor and very crisp mouthfeel and frangible texture. The product analyzed 20% by weight protein, 44.0% carbohydrates, 24.0% fats, and 3.2% water.

It is believed that one having ordinary skill in the art could alter the details of the process taught by the above description to obtain the desired product. These variations are considered within the inventive concept which is limited only by the scope of the appended claims and the reasonable equivalents thereto.

We claim:

1. A process for producing a crisp, fried snack food product having improved nutritional properties, improved palatability and stability on storage comprising; forming a mixture of water, a pregelatinized starch, and a soy protein isolate which has not been subjected to the gelling action of heat whereby said mixture contains between about 30 to 48% water, between about 41 to 49% pregelatinized starch, between about 16 and 25% protein and between about 0.25 and 4.0% of a starch modifying and complexing agent; forming the mixture into a shaped food product without heat gelling of the protein isolate, stretching the formed food product to elongate said product to between about 25 to 100% of its original length, and frying the elongated and shaped product to provide the product with an improved crisp texture which is substantially free of large, hollow, balloon-like bubbles.

2. The process of Claim 1 wherein between about 0.25 and 4.0% by weight of glyceryl monostearate is added to the mixture as said starch modifying and complexing agent.

3. The process of Claim 1 wherein the pregelatinized starch is potato flour.

4. The purpose of Claim 1 wherein the pregelatinized starch is a modified starch material selected from the group consisting of acid modified starch, esterified starch and partially dextrinized starch.

5. A crisp, snack food product having improved nutritional and storage properties and being substantially free of large, hollow, balloon-like bubbles comprising; a crisp fried matrix of between about 48 and 56% starch, between about 16 and 25% soy isolate protein, between about 2 and 6% moisture, between about 12 and 35% fat, and between about 0.25 and 4.0% of a starch modifying and complexing agent, said matrix being characterized by hydrophilic sites, on the starch molecules, blocked by the protein and starch complexing agent, and characterized by a length of between 25 and 100% longer than its original length.

6. The product of Claim 5 wherein said starch complexing agent is glyceryl monostearate.

References Cited

UNITED STATES PATENTS

| | | | |
|---|---|---|---|
| 3,027,258 | 3/1962 | Markakis | 99—100 |
| 3,259,503 | 7/1966 | Tan | 99—100 |
| 3,282,701 | 11/1966 | Wong | 99—100 |
| 3,282,704 | 11/1966 | Fritzberg | 99—100 |
| 3,297,450 | 1/1967 | Loska | 99—100 |
| 3,396,036 | 8/1968 | Liepa | 99—100 |
| 3,447,934 | 6/1969 | Weiner | 99—207 |
| 3,502,479 | 3/1970 | Singer | 99—100 P |
| 3,579,432 | 7/1970 | Succo | 99—100 |

WILBUR L. BASCOMB, Jr., Primary Examiner

M. G. MULLEN, Assistant Examiner

U.S. Cl. X.R.

426—343, 346, 347, 372, 441, 512

UNITED STATES PATENT OFFICE
CERTIFICATE OF CORRECTION

Patent No. 3,849,582           Dated Nov. 19, 1974

Inventor(s) Peter A. Blagdon, et al

It is certified that error appears in the above-identified patent and that said Letters Patent are hereby corrected as shown below:

Column 2, line 8, "16 to 25" should read "16 to 25%"

Column 2, line 14, the word "hot" should be inserted after the first word "the", before the word "oil".

Column 2, line 40, the word "genatinized" should read "gelatinized".

Column 5, line 74, the word "crosp" should read "crisp".

Column 7, line 8, the word "at" should be inserted for the second word "and".

Signed and sealed this 15th day of April 1975.

(SEAL)
Attest:

RUTH C. MASON
Attesting Officer

C. MARSHALL DANN
Commissioner of Patents
and Trademarks